United States Patent
Herzog et al.

(10) Patent No.: US 7,599,599 B2
(45) Date of Patent: Oct. 6, 2009

(54) CABLE MANAGEMENT PANEL WITH REAR ENTRY

(75) Inventors: Daniel J. Herzog, Chanhanssen, MN (US); Chad J. Sjodin, Shakopee, MN (US); David E. Rapp, Eden Prairie, MN (US); Joy McKnight, Carver, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/157,395

(22) Filed: Jun. 9, 2008

(65) Prior Publication Data

US 2008/0247723 A1 Oct. 9, 2008

Related U.S. Application Data

(62) Division of application No. 11/196,523, filed on Aug. 2, 2005, now Pat. No. 7,397,996.

(51) Int. Cl.
*G02B 6/00* (2006.01)
(52) U.S. Cl. .................... 385/135; 385/53; 385/134
(58) Field of Classification Search .............. None
See application file for complete search history.

(56) References Cited

U.S. PATENT DOCUMENTS

| | | | |
|---|---|---|---|
| 4,792,203 A | 12/1988 | Nelson et al. | |
| 5,066,149 A | 11/1991 | Wheeler et al. | |
| 5,497,444 A | 3/1996 | Wheeler | |
| 5,511,144 A | 4/1996 | Hawkins et al. | |
| 5,946,440 A | 8/1999 | Puetz | |
| 6,438,310 B1 | 8/2002 | Lance et al. | |
| 6,483,310 B1 | 11/2002 | Meador | |
| 6,504,988 B1 | 1/2003 | Trebesch et al. | |
| 6,748,155 B2 | 6/2004 | Kim et al. | |
| 7,397,996 B2 | 7/2008 | Herzog et al. | |
| 2002/0150372 A1 | 10/2002 | Schray | |
| 2003/0007767 A1 | 1/2003 | Douglas et al. | |
| 2003/0174996 A1 | 9/2003 | Henschel et al. | |
| 2003/0202765 A1 | 10/2003 | Franklin et al. | |
| 2003/0223723 A1 | 12/2003 | Massey et al. | |
| 2004/0086252 A1 | 5/2004 | Smith et al. | |
| 2005/0025444 A1 | 2/2005 | Barnes et al. | |

OTHER PUBLICATIONS

"Bulkhead/splice mod installation drawing," ADC Telecommunications, Inc., 2 pages (Publicly known more than one year prior to the filing date of the present application).

*Primary Examiner*—Tina M Wong
(74) *Attorney, Agent, or Firm*—Merchant & Gould P.C.

(57) ABSTRACT

A cable management panel including a chassis, a drawer, and a drop-in plate for managing fiber optic cables. The chassis provides rear cable access, the drawer provides side cable access. In one embodiment, the drop-in plate is positionable within the drawer in both a first orientation and a second orientation.

12 Claims, 13 Drawing Sheets

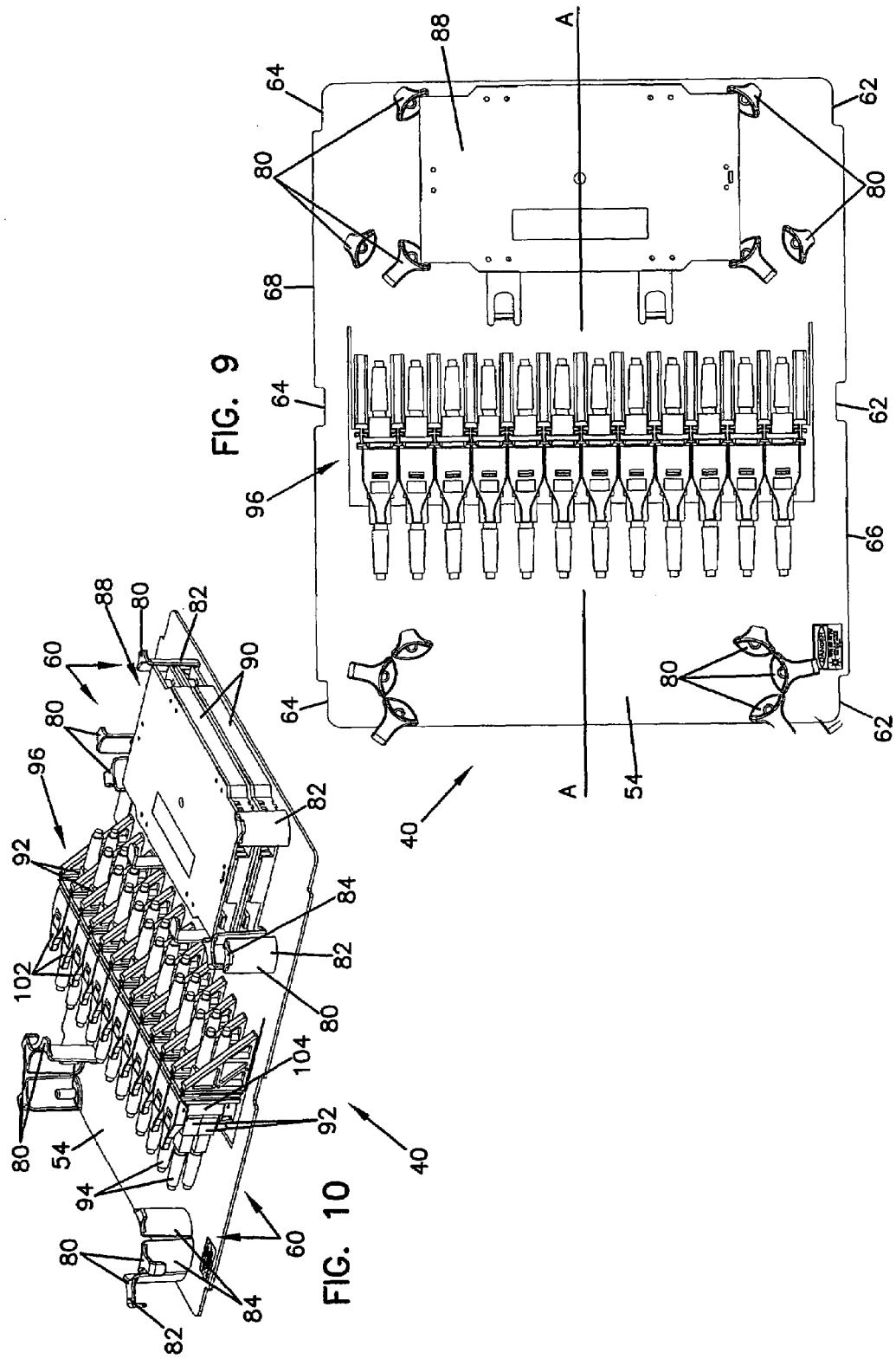

CABLE MANAGEMENT PANEL WITH REAR ENTRY

CROSS-REFERENCE TO RELATED APPLICATIONS

This application is a divisional of U.S. application Ser. No. 11/196,523, filed Aug. 2, 2005 now U.S. Pat. No. 7,397,996; which application is incorporated herein by reference.

TECHNICAL FIELD

This disclosure relates generally to methods and devices for management of telecommunication cables. More particularly, this disclosure relates to a cable management panel having a drawer and drop-in plate for managing fiber optic cables.

BACKGROUND

Cable management arrangements for cable termination, splice, and storage come in many forms. One cable management arrangement used in the telecommunications industry today includes sliding drawers installed on telecommunication equipment racks. The drawers provide organized, high-density, cable termination, splice, and storage in telecommunication infrastructures that often have limited space.

Because telecommunication infrastructures are massive in scale, original installation and subsequent adaptation of the infrastructures can be difficult to manage. Accordingly, the ability to adapt cable management arrangements and schemes is important. There is a continued need in the art for better cable management devices and arrangements to address concerns regarding adaptability and ease of use of cable management arrangements.

SUMMARY

The present disclosure relates to a cable management panel having a chassis, a slidable drawer, and a drop-in plate. One aspect of the present disclosure relates to a drop-in plate positionable within the drawer in both first and second orientations. Another aspect relates to a drop-in plate having a symmetrical footprint about a longitudinal axis.

The drawer of the present disclosure includes a lip that receives an edge of a drop-in plate to secure the plate within an interior region of the drawer. The chassis of the present disclosure includes rear openings for rear cable access, and side openings for side cable access.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

BRIEF DESCRIPTION OF THE DRAWINGS

FIG. 3A is an enlarged detail view of a portion of the cable management panel of FIG. 3;

FIG. 8 is a top plan view of the cable management panel of FIG. 7;

FIG. 9 is a top plan view of the drop-in plate of FIGS. 1 and 7;

FIG. 10 is a perspective view of the drop-in plate of FIG. 9;

DETAILED DESCRIPTION

Reference will now be made in detail to various features of the present disclosure that are illustrated in the accompanying drawings. Wherever possible, the same reference numbers will be used throughout the drawings to refer to the same or like parts.

Figure 1:
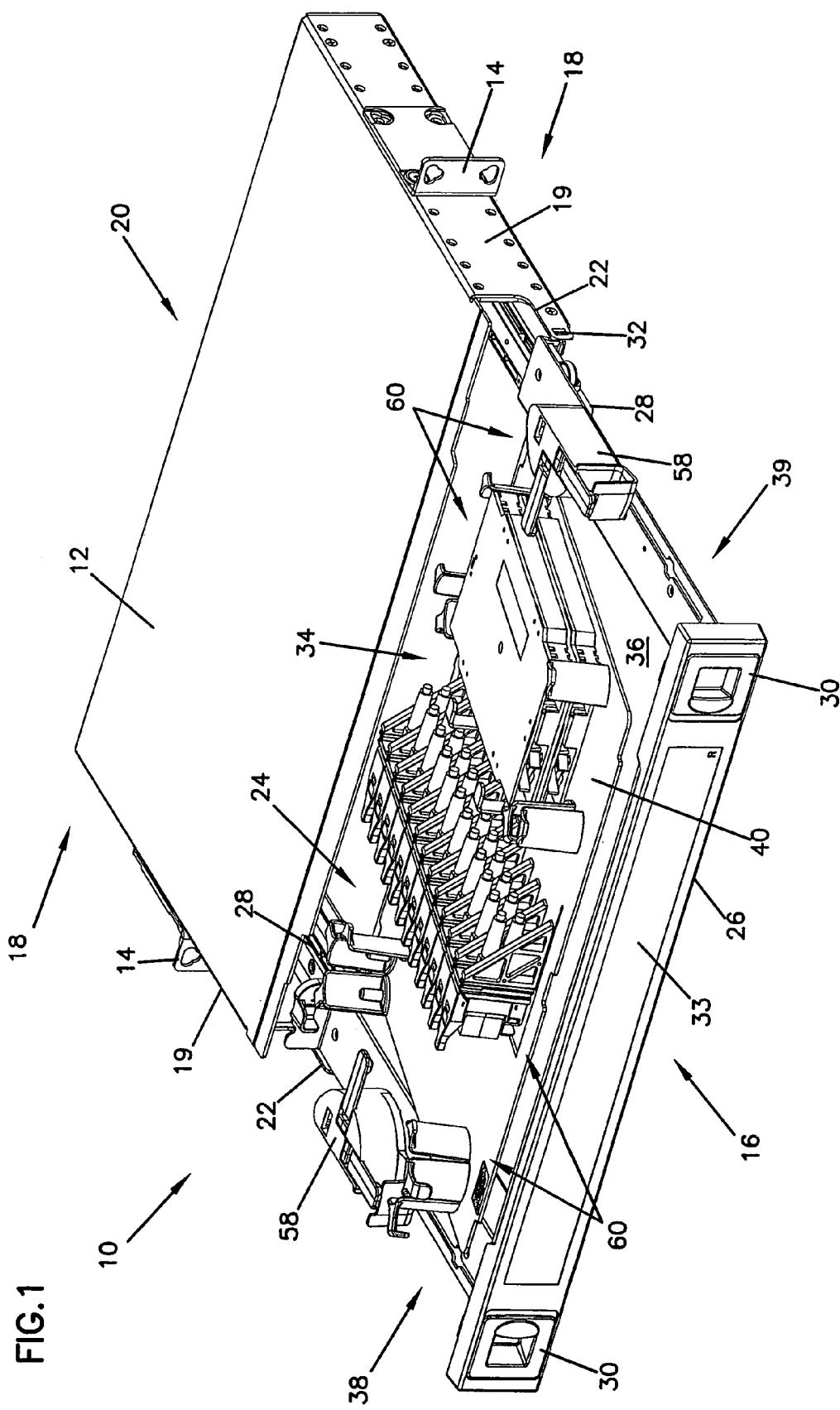
FIG. 1 is a front perspective view of one embodiment of a cable management panel according to the principles of the present disclosure, showing an embodiment of a drop-in plate partially inserted into a drawer in a first orientation.

Referring to FIG. 1, a cable management panel or module 10 according to the present invention is shown. The panel 10 includes a frame or chassis 12 having mounting brackets 14. Further details of an example mounting bracket arrangement that can be used in accordance with the principles disclosed is described in U.S. Publication No. 2005/0025444, the disclosure of which is hereby incorporated by reference. The mounting brackets 14 are used to mount the panel 10 to a telecommunication structure, such as a telecommunication rack 100 partially shown in FIG. 3. The cable management panel 10 can also be configured for mounting within a cabinet, enclosure, or on other mounting fixtures.

Referring still to FIG. 1, the chassis 12 of the cable management panel 10 has a front 16, opposite sides 18, and a rear 20. The sides 18 include sidewalls 19 each having cable access openings 22 for cables entering or exiting the chassis 12. The chassis 12 further includes a drawer 26 that slides between an opened position and a closed position. In the closed position, cables contained within an interior region 24 of the drawer 26 are enclosed and protected. In the opened position, the cables can be accessed for maintenance purposes, for example.

The drawer 26 slides relative to the chassis 12 via two drawer slide assemblies 28 located at the opposite sides 18 of the chassis 12. Latches 30 are provided on both sides of the drawer 26 for securing the drawer 26 in the closed position. In the closed position, each latch 30 engages a side hole 32 located at the side 18 of the chassis 12.

Figure 2:
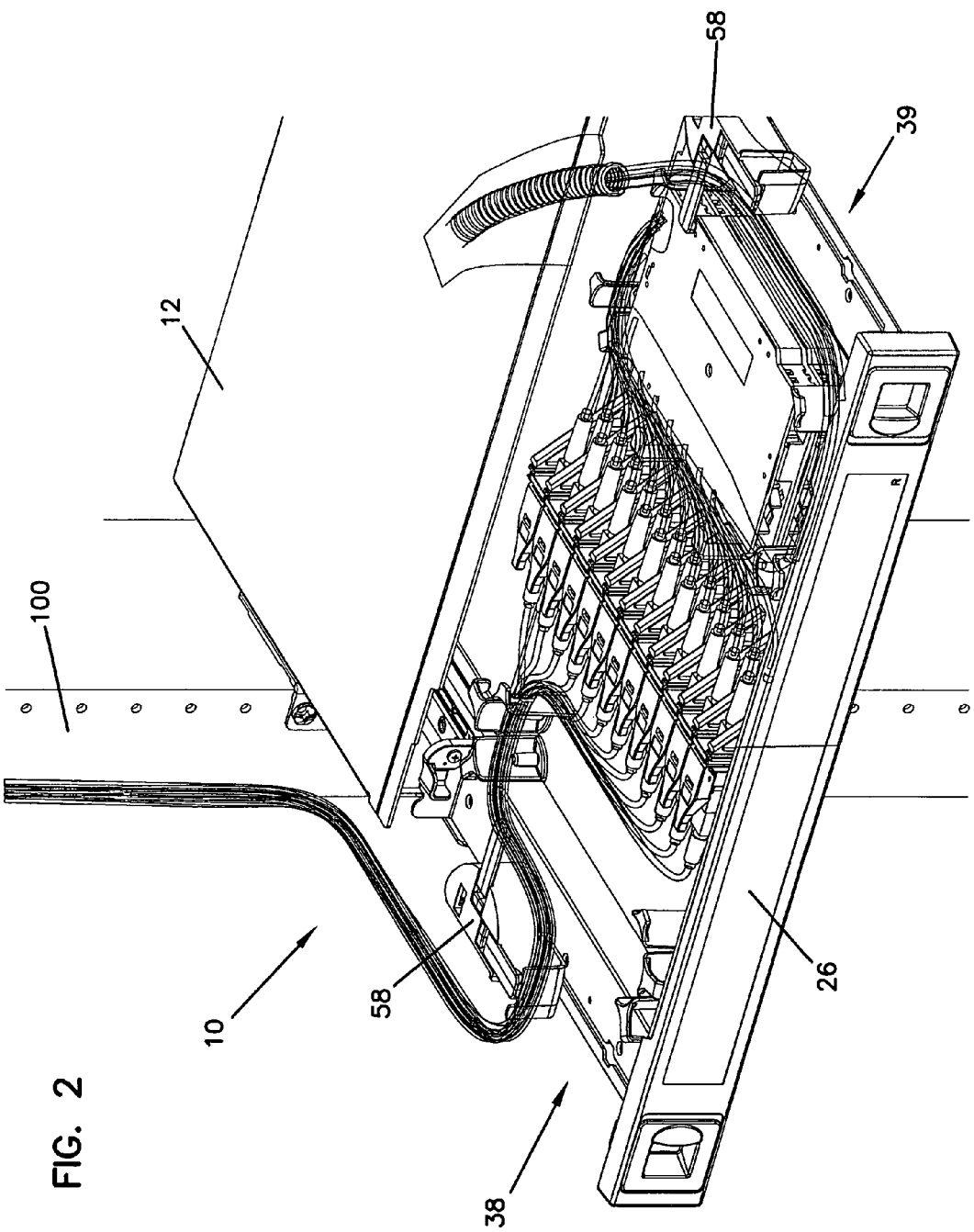
FIG. 2 is a front perspective view of the cable management panel of FIG. 1, showing side cable access.

The drawer 26 of the cable management panel 10 includes a front 33, a rear 34, a base 36, and sides 38, 39. The rear 34 of the drawer 26 is open. Likewise, the sides 38, 39 of the drawer 26 are open. As shown in FIG. 2, the open sides 38, 39 allow for cable entry and exit and prevent cable damage during sliding movement of the drawer 26. Radius limiters 58 are provided for managing the exiting and entering cables during sliding movement of the drawer 26. The radius limiters 58 also protect the cables from damage by limiting cable bending beyond a minimum bend radius of the cable.

Figure 3:
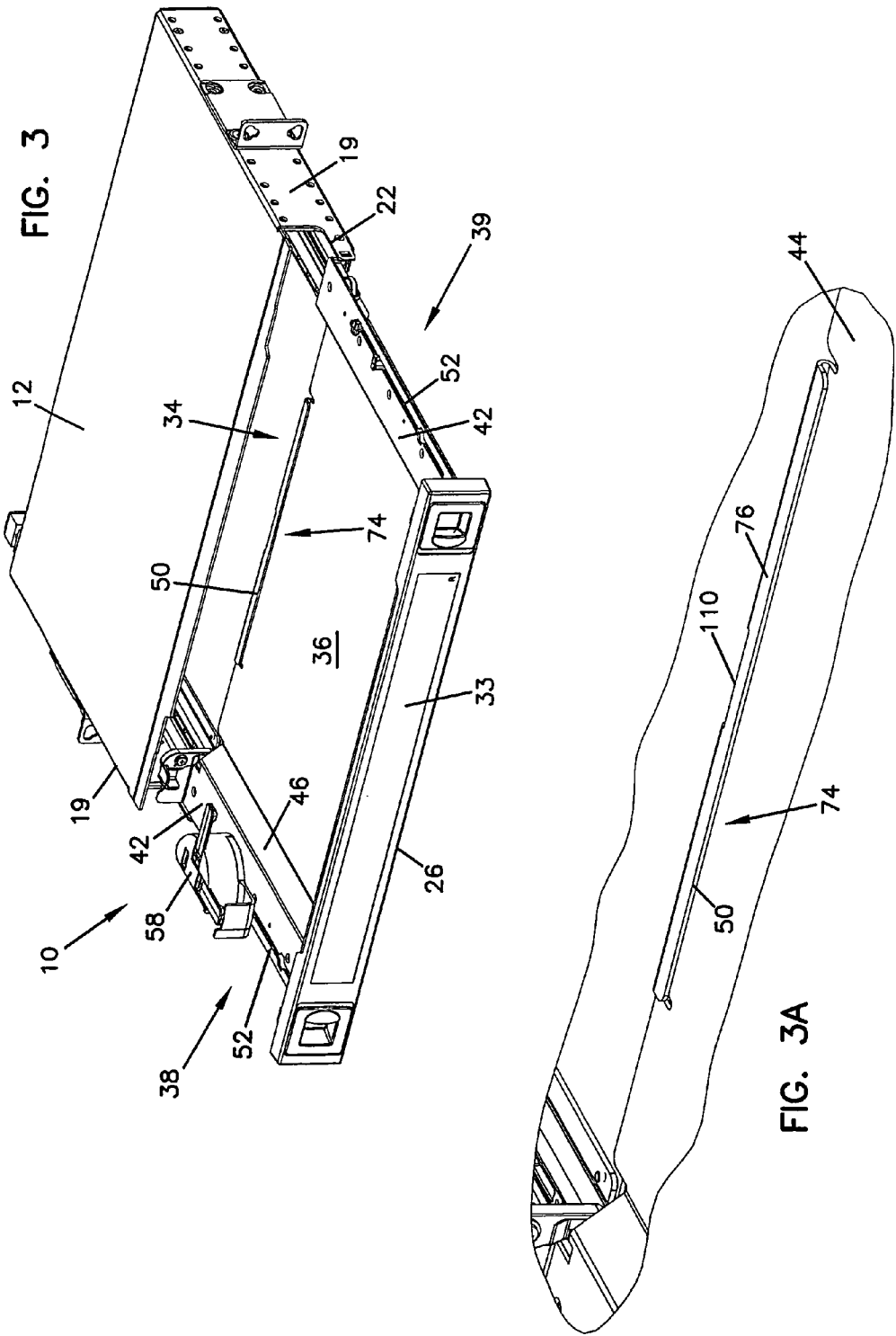
FIG. 3 is a front perspective view of the cable management panel of FIG. 1, shown without the drop-in plate.

Referring now to FIG. 3, the base 36 of drawer 26 includes side plates 42, a central bottom 44, and angled transition sections 46 (only one viewable). The angled transition sections 46 are located at each side of the bottom 44 and interconnect the bottom 44 to the side plates 42. The side plates 42 of the base 36 include longitudinal slots 52. The longitudinal slots 52 cooperate with the radius limiters 58 (only one shown in FIG. 3) on each side of drawer 26 for managing optical fibers entering and exiting the cable management panel 10. The radius limiters 58 act as guides for cables passing through the access openings 22 and passing through each of the open sides 38, 39 of drawer 26. Preferably, the radius limiters 58 are moveably mounted relative to the chassis 12 and drawer 26. More preferably, movement of the radius limiters 58 is controlled in a synchronized manner relative to the movement of the drawer 26. Further details of example drawers having radius limiters and having synchronized drawer movement is described in U.S. Publication No. 2003/0007767 and U.S. Pat. Nos. 6,438,310 and 6,504,988; the disclosures of which are hereby incorporated by reference.

Figure 4:
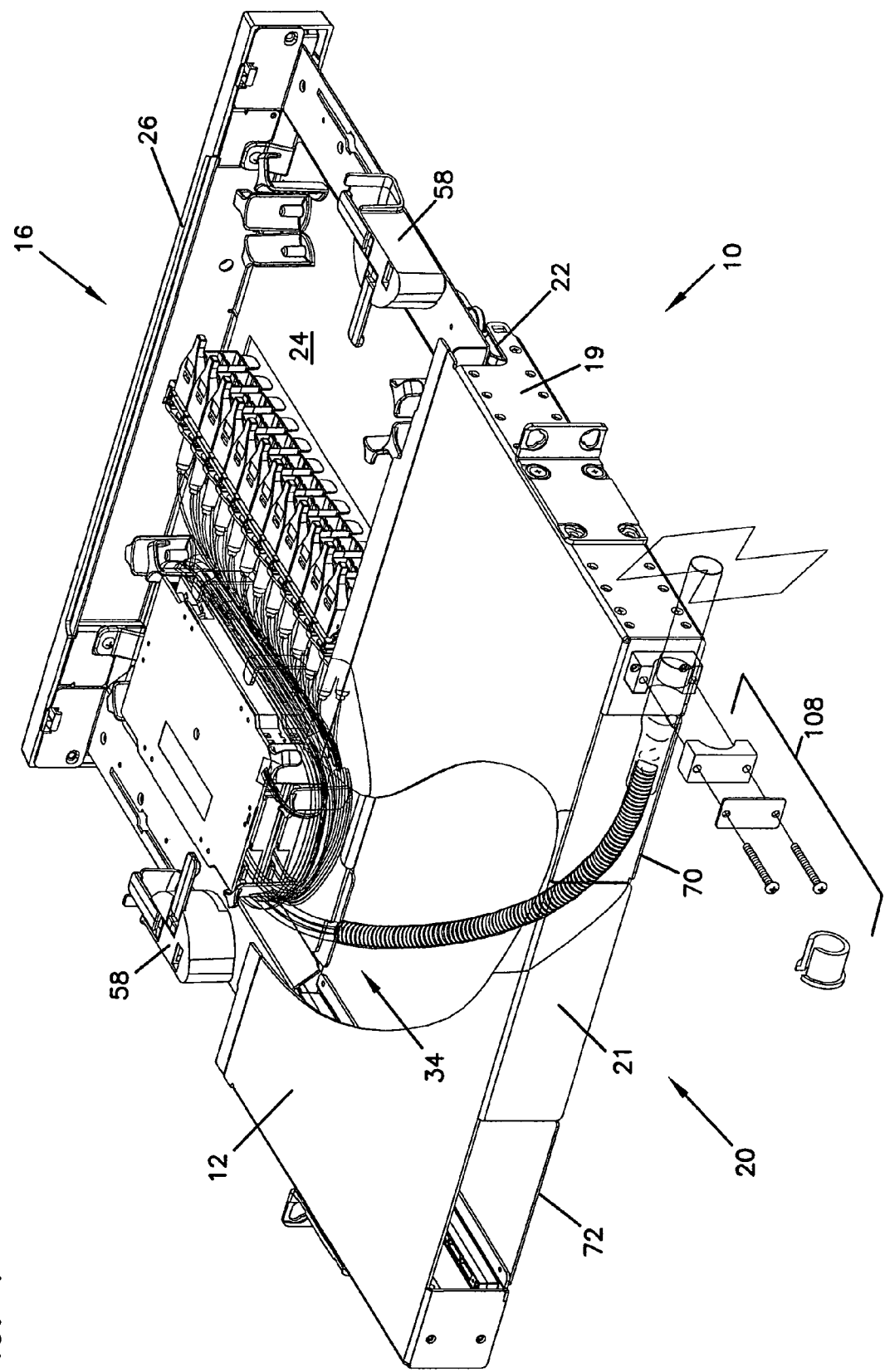
FIG. 4 is a rear perspective view of the cable management panel of FIG. 1, showing rear cable access.

Referring now to FIG. 4, first and second rear access openings 70, 72 are formed in a rear wall 21 located at the rear 20 of the chassis 12. In use, first and second cable pathways into or out from the interior region 24 of the drawer 26 are provided through the respective first and second rear access openings 70, 72, and through the open rear 34 of the drawer 26. Cables passing through the first or second rear access openings 70, 72 can be secured to the rear wall 21 of the chassis 12 by a clamp arrangement 108.

Referring back to FIG. 1, the drawer 26 of the illustrated embodiment includes a variety of cable management elements 60 (e.g., cable management structures and distribution components or devices). The interior region 24 of the drawer 26 is sized for receiving the cable management elements 60. When the drawer 26 is in the closed position, the cables and cable management elements 60 in the interior region 24 are protected. In the preferred embodiments, some of the elements 60 are conveniently provided on a drop-in plate or tray insert 40, which drops into the interior region 24 of drawer 26. The cable management elements 60 can be mounted to the plate 40 by fasteners, bonded by adhesive, or formed as an integral construction of the plate. In FIG. 1, the drop-in plate 40 is shown only partially inserted into the interior region 24 of the drawer 26.

Figure 5:
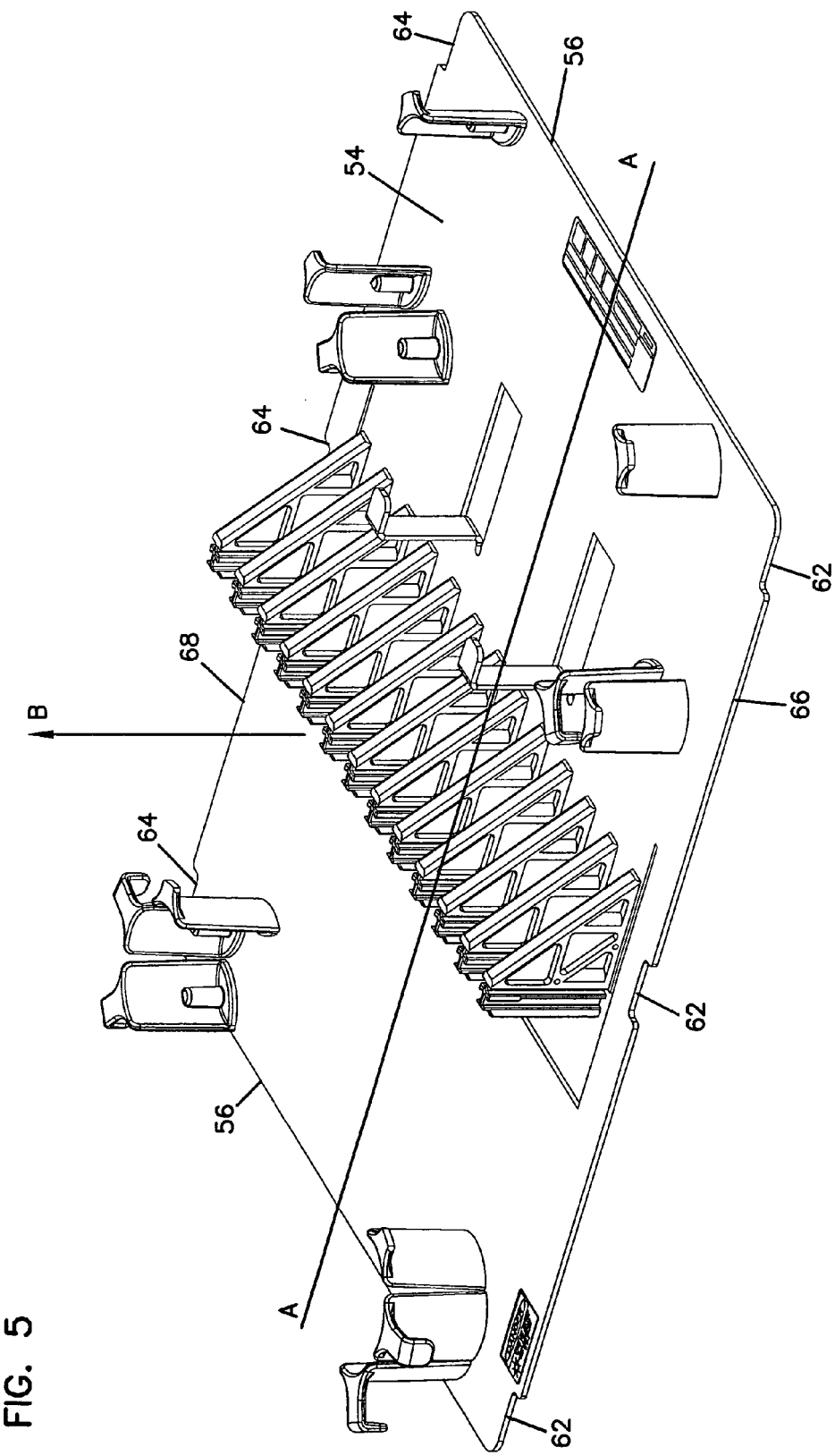
FIG. 5 is a perspective view of the drop-in plate of FIG. 1, shown without some cable management elements.

FIG. 5 illustrates one embodiment of the tray insert or drop-in plate 40. In FIG. 5, the drop-in plate 40 is shown without some of the cable management elements 60. The drop-in plate 40 includes a base 54 that defines an axis A-A extending between opposite edges 56 of the plate 40. In the illustrated embodiment, the axis A-A is a longitudinal axis.

Figure 6:
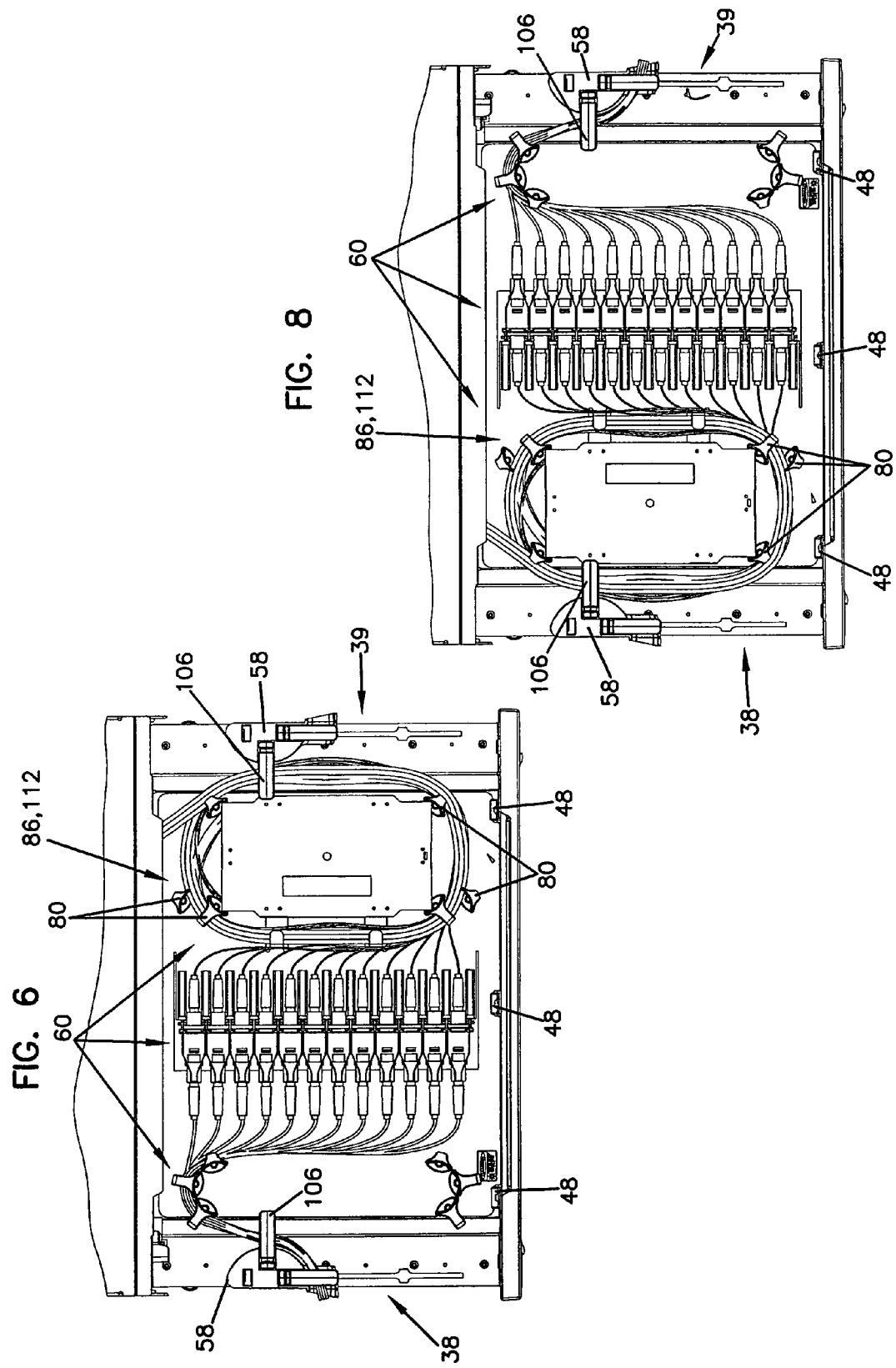
FIG. 6 is a top plan view of the cable management panel of FIG. 1.
Figure 7:
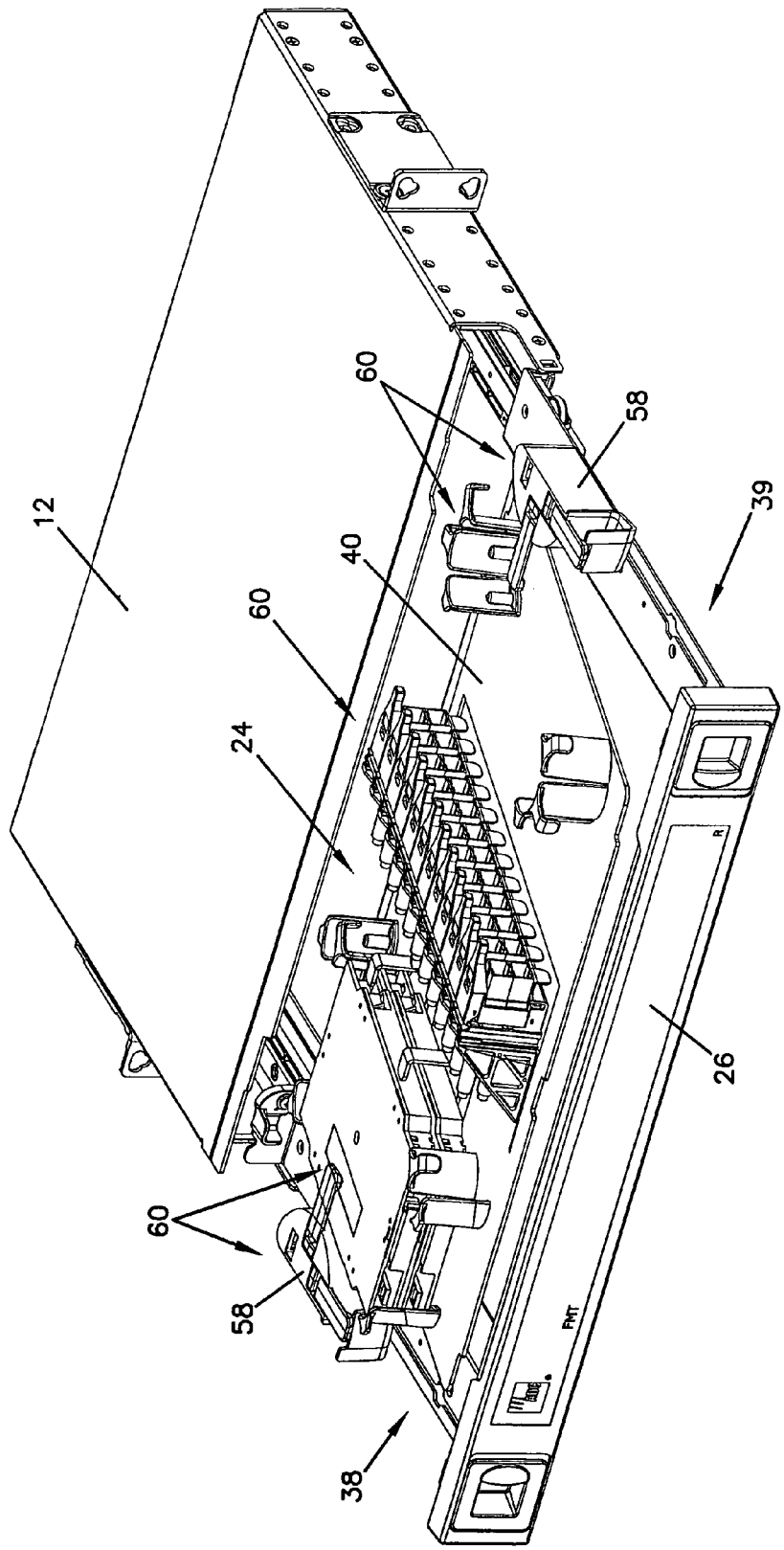
FIG. 7 is a front perspective view of the cable management panel of FIG. 1, showing the drop-in plate partially inserted into the drawer in a second orientation.

Referring now to FIGS. 1 and 6-8, the drop-in plate 40 is preferably constructed so that the plate 40 can be positioned within the drawer 26 in both a first orientation (shown in FIGS. 1 and 6) and a second orientation (shown in FIGS. 7 and 8). The first orientation (FIG. 1) is generally 180 degrees in rotation relative to the second orientation (FIG. 7).

In particular, the drop-in plate 40 is constructed to be a reversible drop-in plate. That is, a user can selectively spin or rotate the plate 40 about an axis B (FIG. 5) transverse to the base 54 and position the plate within the interior region 24 of the drawer 26 in either one of the first and second orientations. By this, cables pass into or out of the interior region 24 of the drawer 26 through a selected one of the first and second rear access openings 70, 72, depending upon the particular orientation of the plate 40. Similarly, cables pass in through or out of the corresponding open side 38, 39 of the drawer 26 (see FIGS. 3 and 4).

In the first orientation shown in FIGS. 1 and 6, the first cable pathway is provided through the first rear access openings 70 (FIG. 4) and into the interior region 24 of the drawer 26. The cables are contained and managed within the drawer 26 by the cable management elements 60. When the plate 40 is positioned in the first orientation, side cable access is provided at the first open side 38 of the drawer 26.

In the second orientation shown in FIGS. 7 and 8, the second cable pathway is provided through the second rear access openings 72 (FIG. 4) and into the interior region 24 of the drawer 26. The cables are contained and managed within the drawer 26 by the cable management elements 60. When the plate 40 is positioned in the second orientation, side cable access is provided at the second open side 39 of the drawer 26.

The universal, reversible feature of the drop-in plate 40 accommodates adaptation of the telecommunication infrastructures not possible with conventional arrangements. Depending upon the needs of the application, the cable management panel 10 selectively provides left-side cable access or right-side cable access.

Referring now to FIG. 9, the base 54 of the drop-in plate 40 includes a first set of notches or cutouts 62 formed along a first longitudinal edge 66 of the base 54, and a second set of notches or cutouts 64 formed along a second longitudinal edge 68 of the base. In the illustrated embodiment, the sets of notches 62, 64 each include three notches: a center notch and two corner notches. The notches 62, 64 provide clearance for securing elements, such as snap clips 48 (FIGS. 6 and 8, and FIG. 15 as Ref. No. 248), which are attached to the drawer 26. The snap clips 48 are used to secure the drop-in plate 40 within the drawer 26.

In addition, the notches 62, 64 formed in the base 54 of the plate 49 function as keying or guide structures. That is, the notches aid in properly locating the drop-in plate 40 within the interior region 24 of the drawer 26. For example, when the plate 40 is inserted into the drawer 26 in the first orientation, the first set of notches (e.g., 62) receives the clips 48 (FIG. 6) located at the front 33 of the drawer 26. The second set of notches 64 is symmetrically located to receive the clips 48 when the plate 40 is inserted in the drawer 26 in the second orientation (FIG. 8). The symmetrical footprint of the drop-in plate, i.e., the symmetrical construction of the first and second sets of notches 62, 64, contributes to the reversibility feature of the drop-in plate 40.

Referring back to FIG. 3, to aid in securing the drop-in plate 40 within the drawer 26, a lip 50 is provided adjacent to the open rear 34 of the drawer 26. When the plate is inserted within the interior region 24 of the drawer 26, one of the first and second longitudinal edges 66, 68 is positioned within a space or gap 74 provided under the lip 50. In one embodiment, the lip 50 is manufactured by rolling or curling an extension 76 (FIG. 3A) of the bottom 44 of the drawer 26 upward. The rolled extension 76 or lip 50, in cooperation with the clips 48 and notches 62 or 64, function to retain the drop-in plate 40 in the selected first or second orientation.

Referring to FIG. 3A, in some embodiments, the lip 50 can include a centrally located slot 110. The slot 110 is provided for users wishing to use conventional plates (not shown) with the presently disclosed drawer 26. In particular, some conventional plates, for example, include a central tab and two end tabs extending from a rear edge of the plate. Further details of such an example plate is described in U.S. Pat. No. 6,748,155, the disclosure of which is hereby incorporated by reference. The tabs of the conventional plate fit within apertures formed in a backwall of the conventional drawer. To accommodate use of conventional plates, the slot 110 in the lip 50 of the present drawer 26 is constructed to receive the central tab of conventional plates. Similarly, the lip 50 has a length that fits between the two end tabs of conventional plates.

Referring now to FIG. 10, in the illustrated embodiment, the drop-in plate 40 includes a number of cable management elements 60 for use with fiber optic cables. For example, the plate 40 includes cable guides 80 positioned at various locations on the base 54. The cable guides 80 extend upwardly from the base 54, and each includes a main arcuate section 82 and an outwardly extending retention tab 84. The cable guides 80 aid in organizing the cables within the drawer 26 and prevent cable damage due to excessive bending.

In one grouping, the cable guides 80 are arranged as an excess cable storage structure 86 (FIG. 6). Excess cable length can be wrapped about the cable storage structure 86, and further appropriately retained by a tab 106 located on the radius limiter 58. In the illustrated embodiment, this same grouping of cable guides also functions as a retaining structure 112 for retaining a stack 88 of splice trays 90. That is, the arcuate sections 82 of the cable guides 80 receive the corners of the splice trays 90 (FIG. 10) to secure the stack 88 of splice trays 90 on the drop-in plate 40.

Still referring to FIG. 10, the example fiber optic cable management elements 60 of the drop-in plate 40 further includes the stack 88 of splice trays 90. The stack 88 in the illustrated embodiment has two splice trays 90. The elements 60 of the drop-in plate 40 also include adapters 92 for connection to fiber optic connectors 94. The adapters 92 are preferably movably mounted to the base 54 in a sliding adapter arrangement 96. The sliding adapter arrangement 96 can include lever arms 102 that allow one of a plurality of slide assemblies 104 to be lifted upwardly to provide easier access to the adapters 92. Further details of an example sliding adapter arrangement that can be used in accordance with the principles disclosed is described in U.S. Pat. No. 5,497,444, the disclosure of which is hereby incorporated by reference. Other adapter arrangements are possible, including arrangements that do not include movable adapters.

The drop-in plate 40 can be customized to include numerous forms of cable management elements 60, as the particular needs for the panel 10 varies. In addition to those elements 60 previously disclosed, examples of other cable management elements include other constructions, assemblies, and devices for storing the cables or connecting the cables to other cables; and/or other fiber optic devices, such as attenuators, couplers, switches, wave divisions multiplexers (WDMs), and splitters/combiners. U.S. Pat. Nos. 6,438,310 and 6,504,988, previously incorporated herein by reference, describe other customized element arrangement examples that can be used in accordance with the principles disclosed.

As can be understood, the cable management configuration of the interior region 24 of drawer 26, e.g., the drop-in plate 40, can vary as the desired functions for cable management panel 10 varies. In one preferred embodiment, however, the arrangement of the cable management elements 60 is symmetrical about the axis A-A, as shown in FIG. 9. Placing the cable management elements 60 (e.g., cable guides 80, the stack 88 of splice trays, and sliding adapter arrangement 96) in a symmetrical configuration further accommodates reversible adaptation of a telecommunication infrastructure, not possible with conventional arrangements. That is, depending upon the needs of the application, the drop-in plate 40 of the cable management panel 10 can rotates to provide left-side cable access, with the cable management elements 60 correspondingly located, or right-side cable access with the cable management elements 60 correspondingly located.

Adaptation of a cable management scheme of a telecommunication infrastructure having conventional cable management arrangements can be difficult to manage. The reversible drop-in plate 40 of the present cable management panel 10 is easy to use and adaptable to a variety of infrastructure configurations.

Figure 11:
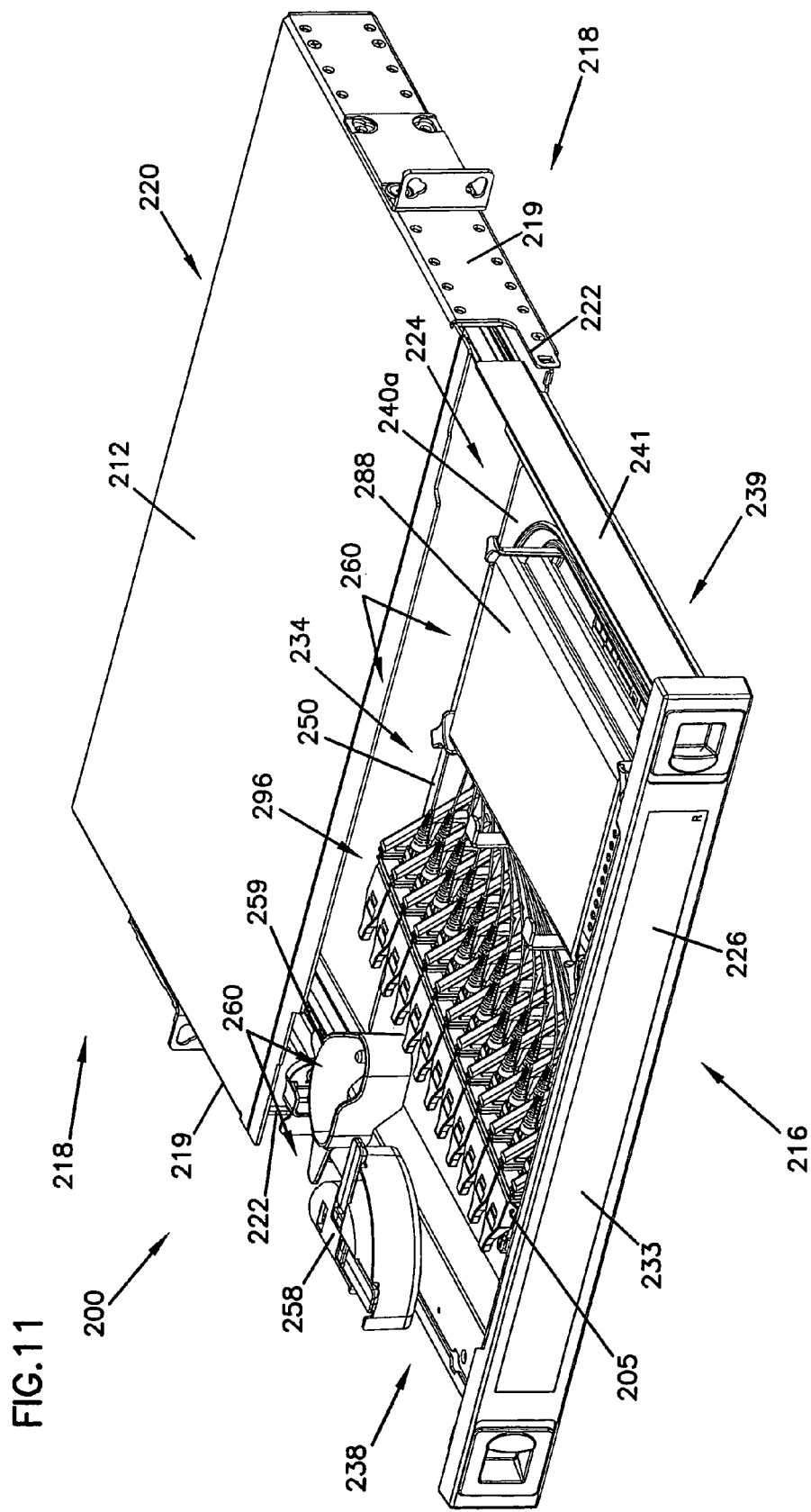
FIG. 11 is a front perspective view of another embodiment of a cable management panel according to the principles of the present disclosure, showing another embodiment of a drop-in plate positioned in a left side cable access orientation.
Figure 15:
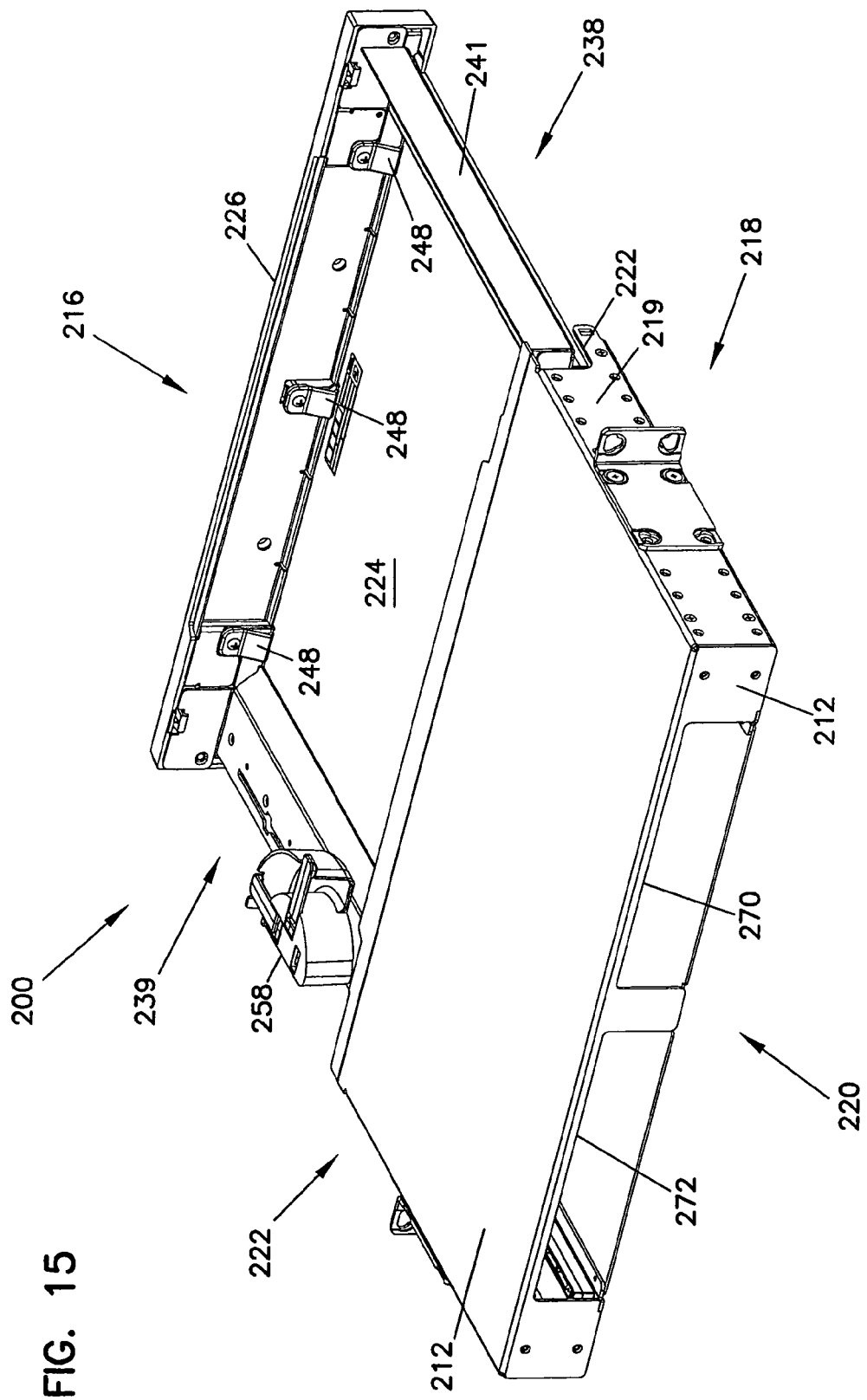
FIG. 15 is a rear perspective view of the panel of FIG. 12, shown without the drop-in plate.

Referring now to FIG. 11, a second embodiment of a cable management panel 200 is illustrated. Similar to the previous embodiment, the panel 200 includes a frame or chassis 212 having a front 216, opposite sides 218, and a rear 220. As shown in FIG. 15, the chassis 212 includes a rear wall 221 at the rear 220 having first and second rear access openings 270, 272 formed in the rear wall 221. The sides 218 include sidewalls 219 each having cable access openings 222 for cables entering or exiting the chassis 212. The chassis 212 further includes a drawer 226 that slides between opened and closed positions.

Figure 12:
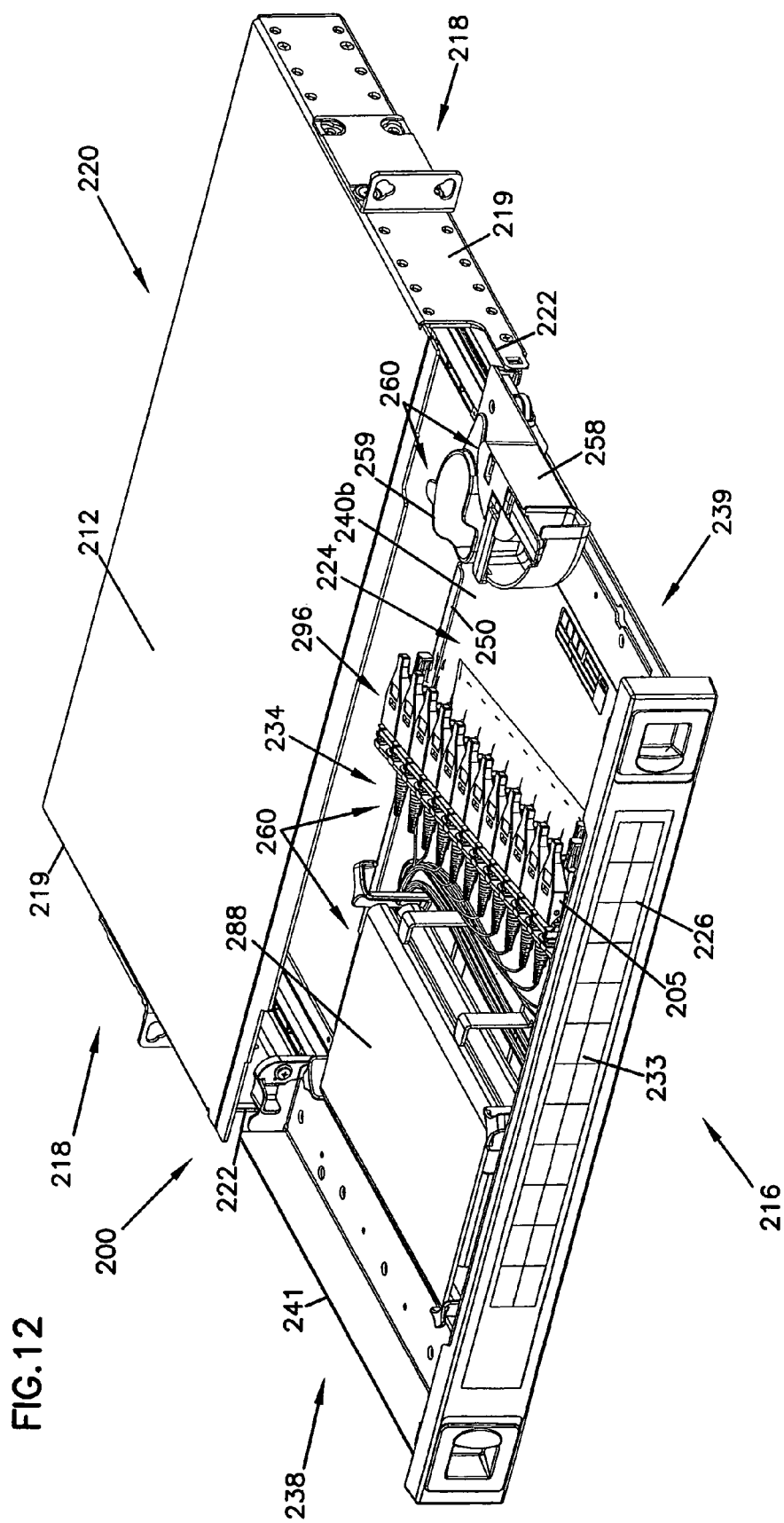
FIG. 12 is a front perspective view of a cable management panel similar to FIG. 11, showing the drop-in plate positioned in a right side cable access orientation.

In the illustrated embodiment, the drawer 226 includes a front 233, an open rear 234, and first and second sides 238, 239. Only one of the first and second sides is an open side. For example, in FIG. 11, the first side 238 is an open side, and in FIG. 12, the second side 239 is an open side. The opposing side in each of FIGS. 11 and 12 is closed. That is, a wall portion 241 is provided at the side opposing the open side. The one open side, e.g., 238 in FIG. 11, allows for cable entry and exit and prevents cable damage during sliding movement of the drawer 226. A radius limiter 258 is provided at the open side 238 for managing the cables exiting or entering during sliding movement of the drawer 226.

In FIGS. 11 and 12, an alternative embodiment of a tray insert or drop-in plate (i.e., 240a and 240b) is illustrated. The plate 240a shown in FIG. 11 is a mirror image of the plate 240b shown in FIG. 12; description applicable to both plates hereinafter refers generally to the plates as reference number 240.

The drop-in plate 240 of FIGS. 11-14 is constructed for use in only one of a first orientation (shown in FIG. 11) and a second orientation (shown in FIG. 12). That is, the plate 240 is not constructed to be a reversible plate that can be accepted within the drawer 226 in both first and second orientations. Rather the plate 240 must be oriented in relation to the one open side of the drawer 226. If the open side of the drawer is on the left side of the drawer, the plate 240 is oriented to correspond to a left-side cable access configuration, as shown in FIG. 11. If the open side of the drawer is on the right side, the plate 240 is oriented to correspond to a right-side cable access configuration, as shown in FIG. 12.

Figure 13:
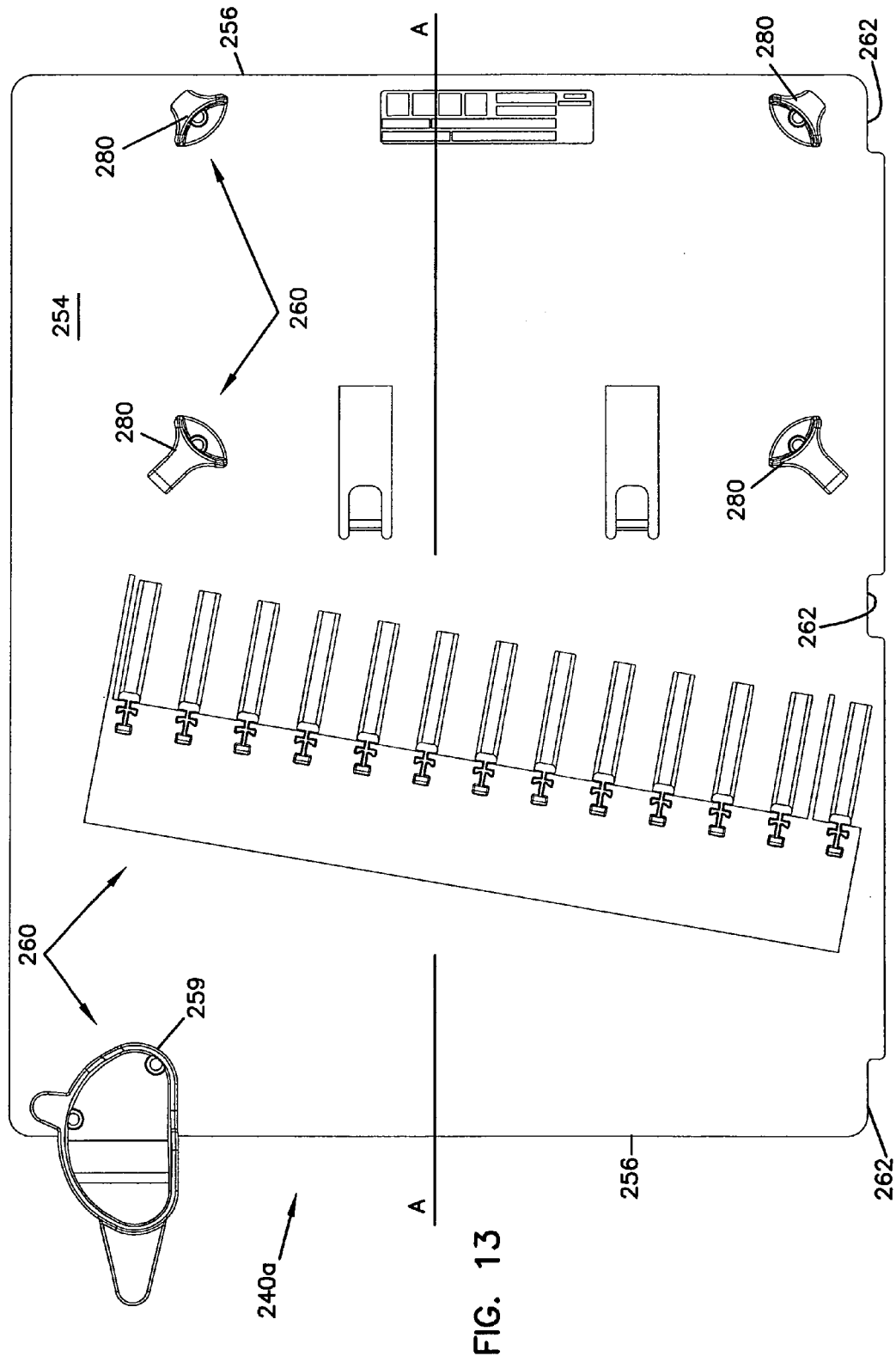
FIG. 13 is a top plan view of the drop-in plate of FIGS. 11 and 12, shown without some cable management elements.
Figure 14:
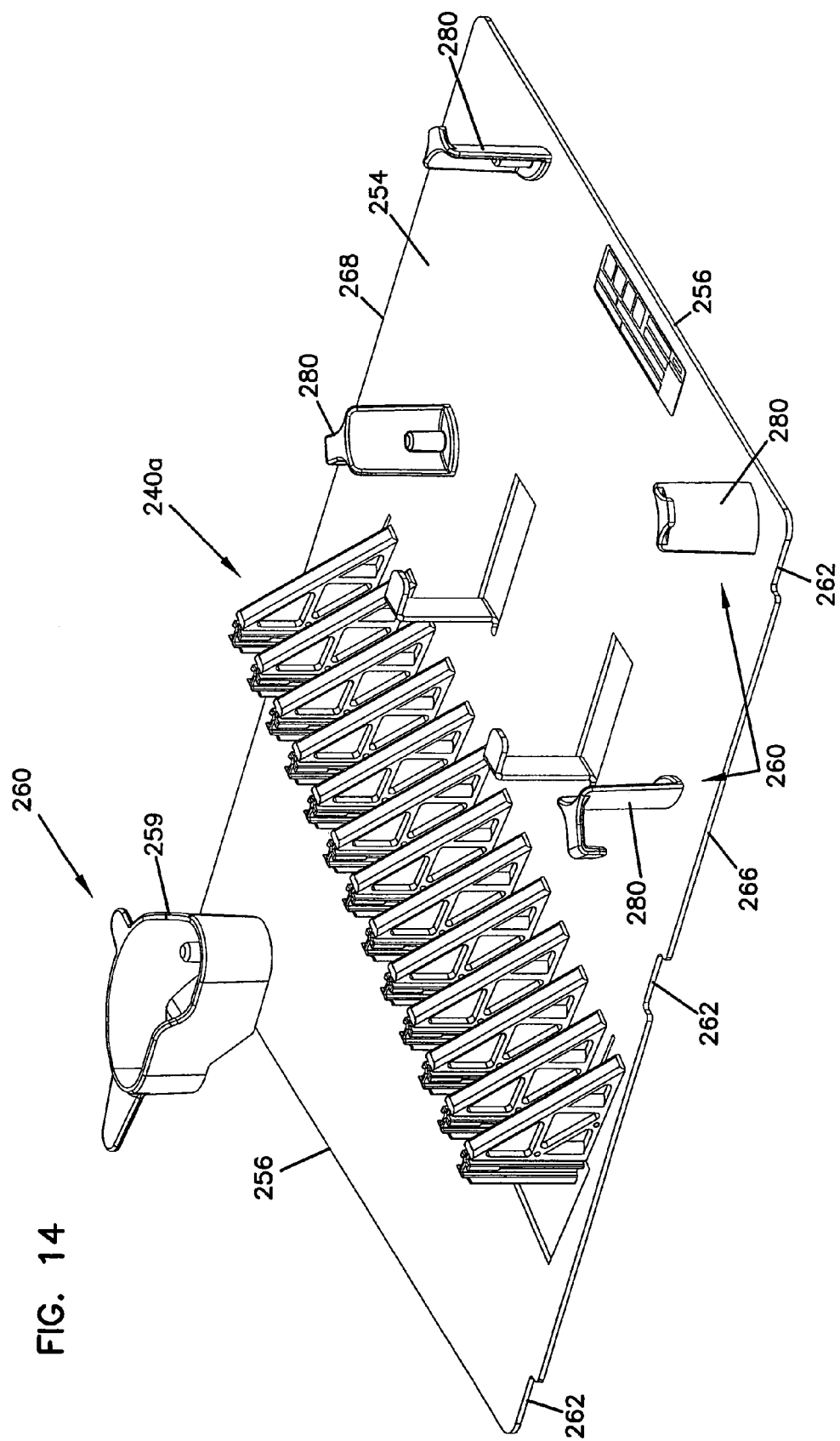
FIG. 14 is a perspective view of the drop-in plate of FIG. 13.

Referring now to FIGS. 13 and 14, the drop-in plate 240 of the panel 200 includes a base 254 (FIG. 13) that defines an axis A-A extending between opposite edges 256 of the plate 240. In the illustrated embodiment, the axis A-A is a longitudinal axis.

The base 254 defines first and second longitudinal edges 266, 268 transverse to opposite edges 256. A set of notches or cutouts 262 is formed along the first longitudinal edge 266. In the illustrated embodiment, the set of notches 262 includes three notches: a center notch and two corner notches. The notches 262 provide clearance for securing elements, such as snap clips 248 (FIG. 15), which secure the drop-in plate 240 within the drawer 226. The notches 262 also function as keying or guide structures that aid in properly locating the drop-in plate 240 within the interior region 224 of the drawer 226 by mating receipt of the clips 248.

Similar to the previous embodiment, to assist in securing the drop-in plate 240 within the drawer 226, a lip 250 (as shown in FIGS. 11, 12, and 3A as Ref. No. 50) is provided adjacent to the open rear 234 of the drawer 226. When the plate 240 is inserted within the interior region 234 of the drawer 226, the second longitudinal edge 268 of the plate is positioned within a space or gap provided under the lip 250.

Referring now to FIGS. 11-15, cable management elements 260 of the illustrated plate 240 include cable guides 280 (FIGS. 13 and 14) positioned at various locations on the base 254, a stack 288 of splice trays (FIGS. 11 and 12), and a sliding adapter arrangement 296 (FIGS. 11 and 12). In addition, the drop-in plate 240 includes a plate-mounted radius limiter 259 (FIG. 14) positioned adjacent the particular edge 256 corresponding to the open side 238 or 239 of the drawer 226. The plate-mounted radius limiter 259 provides enhanced cable protection by increasing the minimum radius of cable managed by the drop-in plate. In particular, the plate-mounted radius limiter 259 is sized to provide a minimum bending radius of about 1.18 inches. To accommodate the larger size of the plate-mounted radius limiter 259, the sliding adapter arrangement 296 is oriented at an angle relative to the longitudinal edges 266, 268 of the plate 240 (see FIG. 13). The angled orientation of the sliding adapter arrangement 296 accommodates cable routing from a slide assembly 205 located nearest the front 233 of the drawer 226, without excessive bending of the cable.

In the disclosed embodiment of FIGS. 11-15, the cable management panel 200 provides both rear cable access and side cable access. The rear cable access is provided through the rear openings 270, 272 of the chassis 212, and the side cable access is provided at the one corresponding open side 238 or 239 of the drawer 226.

The above specification provides a complete description of the invention. Since many embodiments of the invention can be made without departing from the spirit and scope of the invention, certain aspects of the invention reside in the claims hereinafter appended.

What is claimed is:

1. A cable management panel, comprising:
   a) a chassis having a front, a rear, and sides;
   b) a drawer mounted to the chassis, the drawer having a front, an open rear, and open sides, the drawer defining an interior region, the drawer being configured to slide relative to the chassis between an open position and a closed position; and
   c) fiber optic cable management elements located within the interior region of the drawer;
   d) wherein the chassis provides rear cable access to the interior region of the drawer through the open rear of the drawer at the rear of the chassis, and side cable access to the interior region of the drawer through the open sides of the drawer at each of the sides of the chassis.

2. The panel of claim 1, wherein the rear cable access is provided through a rear opening formed in a rear wall of the chassis.

3. The panel of claim 1, wherein the side cable access is provided through a side opening formed in a side wall of the chassis.

4. The panel of claim 1, wherein the fiber optic cable management elements are mounted on a removable plate positioned within the interior region of the drawer.

5. The panel of claim 1, further including a radius limiter positioned to manage cables exiting and entering the drawer during sliding movement of the drawer.

6. The panel of claim 5, wherein the radius limiter is mounted at one of the open sides of the drawer.

7. The panel of claim 5, wherein the radius limiter moves in a synchronized manner relative to the movement of the drawer.

8. A cable management panel, comprising:
   a) a chassis having a rear wall, and side walls, the rear wall defining first and second rear cable-passage openings, the side walls defining first and second side cable-passage openings;
   b) a drawer mounted to the chassis, the drawer having an open rear that accommodates passage of cable from the rear cable-passage openings into an interior region of the drawer, and open sides that accommodate passage of cable from the side cable-passage openings into the interior region of the drawer; and
   c) fiber optic cable management elements located within the interior region of the drawer.

9. The panel of claim 8, wherein the fiber optic cable management elements are mounted on a removable plate positioned within the interior region of the drawer.

10. The panel of claim 8, further including a radius limiter positioned to manage cables exiting and entering the drawer during sliding movement of the drawer.

11. The panel of claim 10, wherein the radius limiter is mounted at one of the open sides of the drawer.

12. The panel of claim 10, wherein the radius limiter moves in a synchronized manner relative to the movement of the drawer.

* * * * *